United States Patent [19]

Sekioka

[11] Patent Number: 4,836,309
[45] Date of Patent: Jun. 6, 1989

[54] ELECTRONIC WEIGHING INSTRUMENT
[75] Inventor: Kunikazu Sekioka, Gotenba, Japan
[73] Assignee: Tokyo Electric Co., Ltd., Tokyo, Japan
[21] Appl. No.: 236,713
[22] Filed: Aug. 26, 1988
[30] Foreign Application Priority Data Aug. 27, 1987 [JP] Japan .................................. 62-213557

[51] Int. Cl.$^4$ ..................... G01G 23/22; G06K 15/00; G06F 15/20
[52] U.S. Cl. ................................. 177/25.15; 235/383; 364/464.01
[58] Field of Search .................... 364/464.01; 235/383, 235/385; 177/25.15

[56] References Cited

U.S. PATENT DOCUMENTS 3,899,775  8/1975  Larsen ........................... 177/25.15 X
3,906,208  9/1975  Rogers ........................... 177/25.15 X
4,724,306  2/1988  Kitaoka et al. ................... 235/383 X

FOREIGN PATENT DOCUMENTS 0201301  11/1986  European Pat. Off. ......... 177/25.15

Primary Examiner—George H. Miller, Jr.
Attorney, Agent, or Firm—Oblon, Spivak, McClelland, Maier & Neustadt

[57] ABSTRACT

An electronic weighing instrument includes an IC card reading and writing device. An IC card is inserted into the IC card reading and writing device, and as a commodity to be weighed is designated by inputting, a price per unit weight of the designated commodity preset in the IC card is read out. A price of the commodity is calculated from the price per unit weight and a weight of the commodity obtained from a digital signal developed from a load detector, and the weight and the price are indicated on a display unit while a code, the weight, the price per unit weight and the price of the commodity are registered into a registration memory of the IC card. Where a plurality of such weighing instruments are installed, there is no need of provision of a cable interconnecting the weighing instruments. Further, since prices per unit weight of commodities are stored in the IC card, the capacity of the memory required for each weighing instrument can be minimized.

3 Claims, 3 Drawing Sheets

| | |
|---|---|
| 3a | OPERATOR NO. |
| 3b | OPERATOR NAME |
| | PLU NO. |
| | COMMODITY NAME |
| 3i | WEIGHT |
| | PRICE PER UNIT WEIGHT |
| | COMMODITY PRICE |

| | |
|---|---|
| | PLU NO. |
| | COMMODITY NAME |
| 3n | WEIGHT |
| | PRICE PER UNIT WEIGHT |
| | COMMODITY PRICE |
| 3c | TOTAL CUSTOMER NUMBER |
| 3d | TOTAL WEIGHT |
| 3e | TOTAL PRICE |
| 3f | TOTAL COMMODITY NUMBER |

| PLU NO. |
|---|
| CODE |
| PRICE PER UNIT WEIGHT |
| PACKING |
| COMMODITY NAME |

| PLU NO. |
|---|
| CODE |
| PRICE PER UNIT WEIGHT |
| PACKING |
| COMMODITY NAME |

…

ELECTRONIC WEIGHING INSTRUMENT

FIELD OF THE INVENTION AND RELATED ART STATEMENT

This invention relates to an electronic weighing instrument on which an IC card can be used.

A conventional electronic weighing instrument is constituted such that a load is detected, for example, by a load cell and converted into a digital signal by an analog to digital converter, and data of the same is taken in by means of a microcomputer. The microcomputer operates to convert the digital signal thus taken in into weight data represented, for example, by a unit of gram and cause a display unit to indicate the weight data. The microcomputer further operates, in response to an input of a code of a commodity to be weighed or the like, to read out the price per unit weight of the commodity from a preset memory and multiply the same by the weight data obtained by the weighing operation to calculate a price of the commodity weighed and cause the display unit to indicate the price.

Conventionally, in such an electronic weighing instrument, a memory such as a RAM provided in the device is used as a preset memory for storing prices per unit weight and so on of commodities therein.

However, where a plurality of weighing instruments having such a construction as described above are arranged in a juxtaposed relationship, it is desired that commodities to be purchased by a customer be weighed and registered on any of the weighing instruments and then the prices of all of the commodities registered on all of the used weighing instruments by the customer be summed up and indicated on an arbitrary one of the weighing instruments so that the customer may pay the total amount collectively. With such weighing instruments having the construction described above, however, all of the weighing instruments must be interconnected by means of a cable so that data of commodities purchased by a customer may be summed up on any of the weighing instruments. Accordingly, there are problems that wiring of a cable is troublesome and time consuming and such a cable may obstruct the way because it is are installed on passages and so on. Further, since every weighing instrument has a preset memory for various commodity data in the inside of the device, there is a problem that an internal memory in every weighing instrument must have a great capacity.

OBJECTS AND SUMMARY OF THE INVENTION

It is a first object of the present invention to provide an electronic weighing instrument wherein, where a plurality of such weighing instruments are installed, the individual weighing instruments can read commodity data and calculate a sum total of prices of commodities without the necessity of interconnecting them by means of a cord.

It is a second object of the present invention in addition to the first object to provide an electronic weighing instrument wherein, where a plurality of such weighing instruments are installed, every weighing instrument calculates a sum total of prices of commodities and causes a display unit to indicate the total price while at the same time it issues a receipt.

It is a third object of the present invention to minimize the capacity of an internal memory of an electronic weighing instrument.

BRIEF DESCRIPTION OF THE DRAWINGS

FIG. 3 is a diagrammatic representation showing construction of a memory of an IC card;

DETAILED DESCRIPTION OF THE PREFERRED EMBODIMENT

Figure 1:
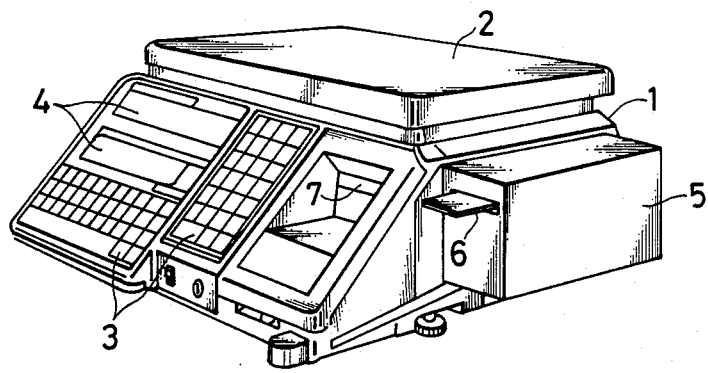
FIG. 1 is a perspective view showing an appearance of an electronic weighing instrument.

An embodiment of the present invention will be described with reference to the drawings. Referring to FIG. 1 which shows an appearance of an electronic weighing instrument, a scale plate 2 is provided above a housing 1, and a keyboard 3 and a display unit 4 are provided on a front wall of the housing 1. An IC card reading and writing device 5 is provided on a side wall of the housing 1. An IC card 6 can be inserted into and ejected from the IC card reading and writing device 5.

A receipt issuing port 7 is formed in the front wall of the housing 1.

Figure 2:
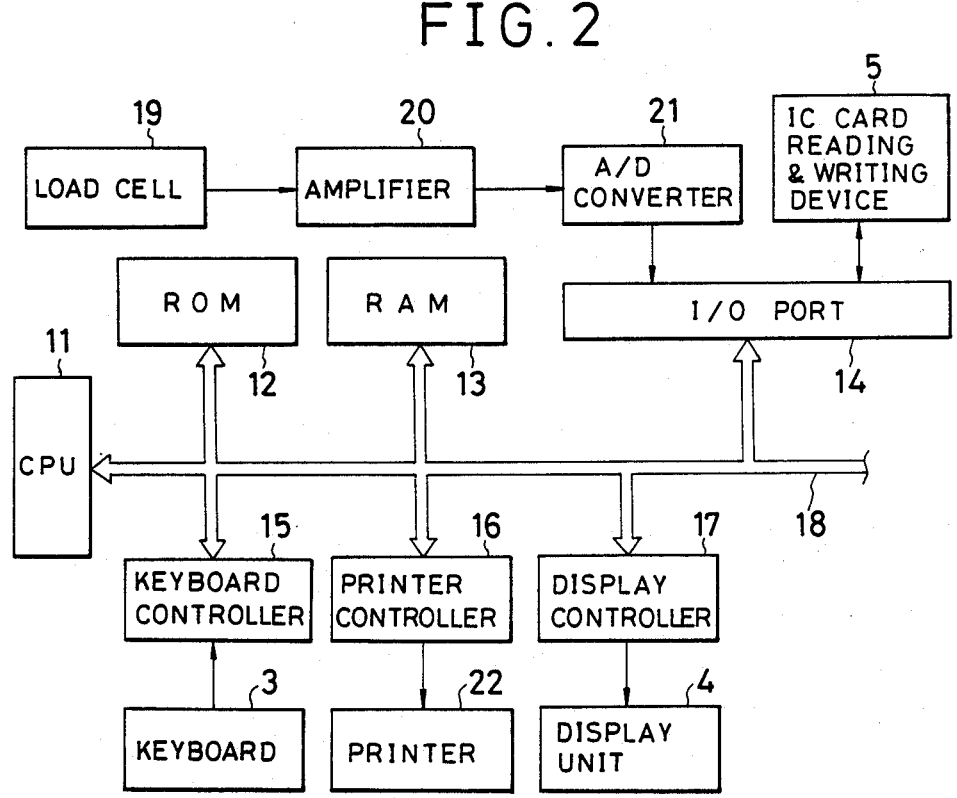
FIG. 2 is a block diagram showing circuit construction of the elctronic weighing instrument of FIG. 1.

Referring now to FIG. 2 which shows construction of a circuit of the electronic weighing instrument shown in FIG. 1, the circuit shown includes a CPU 11 which constitutes a controller main frame, a ROM 12 in which program data with which the CPU 11 controls various components of the electronic weighing instrument are stored, a RAM 13 in which memories for processing various data and so on are provided, an I/O port 14, a keyboard controller 15, a printer controller 16, and a display controller 17.

The CPU is connected to the ROM 12, RAM 13, I/O port 14 and controllers 15, 16 and 17 by way of a bus line 18.

A load applied to the scale plate 2 is detected by a load cell 19 which develops a corresponding voltage signal which is amplified by an amplifier 20 and delivered to an analog to digital converter 21. The load cell 19, amplifier 20 and analog to digital converter 21 generally constitute a load detector. The analog to digital converter 21 converts an analog value of a received voltage signal into a digital value and thus supplies to the I/O port 14 a count data in the form of a digital signal corresponding to the load. The I/O port 14 is also connected to receive data from the IC card reading and writing device 5.

The keyboard controller 15 controls the keyboard 3 so that it may fetch a key signal from the keyboard 3. It is to be noted that the keyboard 3 includes ten keys, a PLU key, a total key for ending registration, a packing key and so on.

The printer controller 16 delivers print data to a printer 22 and controls the printer 22 to print the print data on receipt paper. The printer controller 16 and the printer 22 generally constitute a receipt issuing means.

The display controller 17 controls the display unit 4 to indicate display data thereon.

The IC card 6 includes, as shown in (a) of FIG. 3, a pair of areas 3a and 3b in which an operator number and a name of an operator are stored, respectively, and a total of n commodity registration memories $3_1$ to $3_n$ each for storing therein a PLU (price lookup) number, a commodity name, a weight, a price per unit weight and a price of the commodity. The IC card 6 further includes a total customer number memory 3c, a total weight memory 3d, a total price memory 3e, and a total commodity number memory 3f.

The IC card 6 further includes, as shown in (b) of FIG. 3, a PLU file 3g which is a preset memory device in which a large number of memories each for storing therein a PLU number, a code, a price per unit weight, a packing, a commodity name so on are provided.

Figures 3A, 3B, 4:
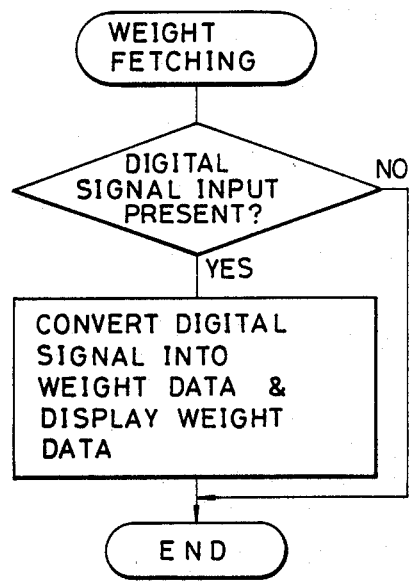
FIG. 4 is a flow chart illustrating processing of fetching calculation data by a CPU.

The CPU 11 fetches a digital signal from the analog to digital converter 21 upon periodic interruption as shown in FIG. 4, converts the digital signal into a weight data of a unit of gram, and cause the display unit 4 to indicate the weight data thereon.

Figure 5:
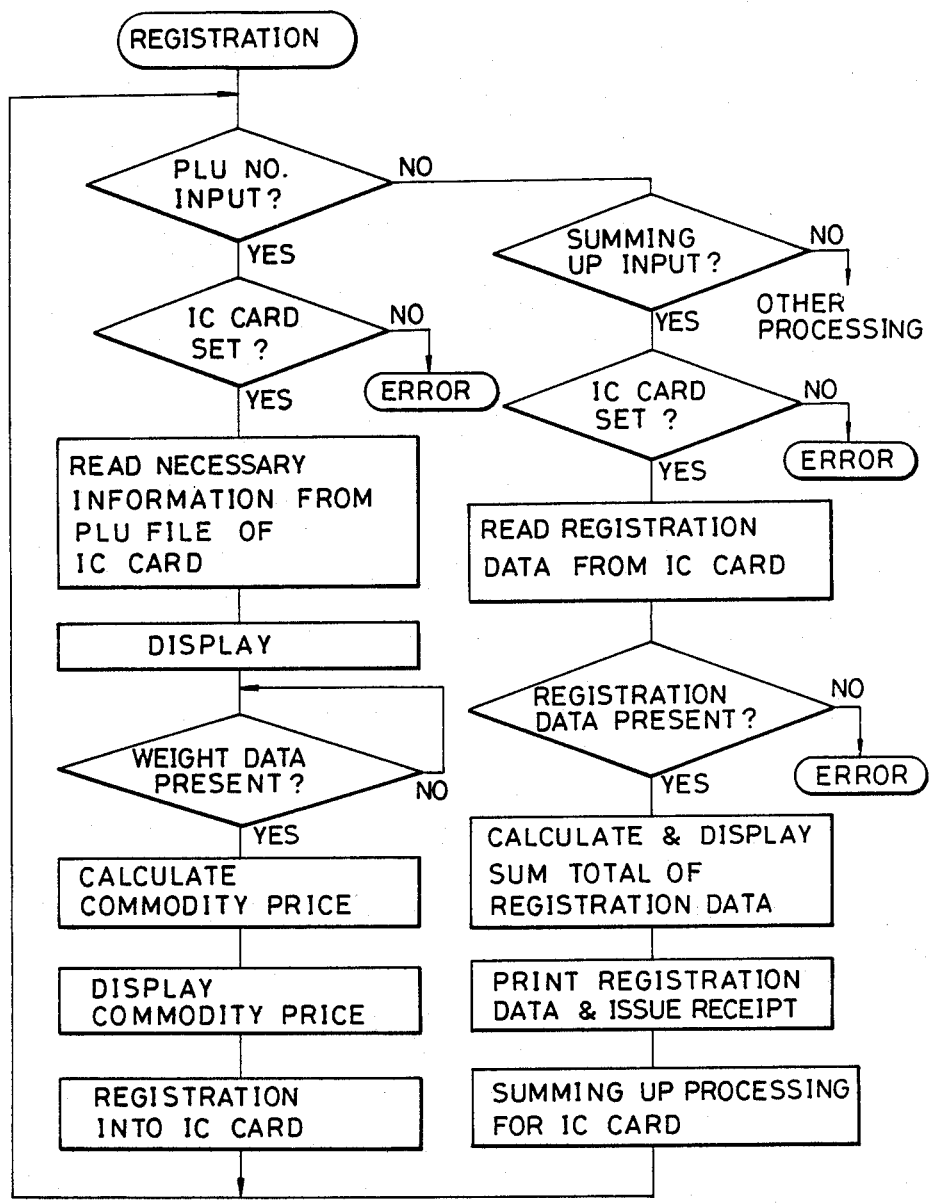
FIG. 5 is a flow chart illustrating processing of weighing and registration by the CPU.

The CPU 11 is designed to execute registration processing illustrated in FIG. 5. Upon reception of an input of a PLU number representative of a commodity by way of the ten keys and the PLU key from the keyboard 3, the CPU 11 checks whether or not an IC card 6 is inserted in position in the IC card reading and writing device 5. It is to be noted that the ten keys and the PLU key constitute means for designating a commodity to be weighed. Then, if no IC card 6 is inserted in position, then processing for an error is executed. To the contrary, in case an IC card 6 is set in position, the CPU 11 reads out reset data of a code corresponding to the designated input PLU number, a price per unit weight, a packing, a commodity name and so on from the PLU file 3g of the IC card 6. The CPU 11 then causes the display unit 4 to display the price per unit weight and the commodity name thereon.

Subsequently, the CPU 11 fetches a digital signal corresponding to a load from the analog to digital converter 21 and checks whether or not the digital signal is stored as a weight data. If the digital signal is stored as a weight data, a price of the commodity to be weighed is calculated from the weight data and the price per unit weight read out from the IC card 6. The CPU 11 then causes the display unit 4 to indicate the price of the commodity thereon.

Subsequently, the PLU number, commodity name, weight, price per unit weight and price of the commodity are stored into vacant areas of the registration memories $3_1$ to $3_n$ of the IC card 6.

Registration of the commodity according to the single weighing operation is thus completed.

On the other hand, if the total key on the keyboard 3 is operated, then the CPU 11 discriminates the summing up input and then checks whether or not an IC card 6 is inserted in position in the IC card reading and writing device 5.

Then, if no IC card 6 is set in position, the CPU 11 executes processing for an error, but on the contrary if an IC card 6 is set in position, the CPU 11 reads out registration data for each of the commodities stored in the registration memories $3_1$ to $3_n$ of the IC card 6, sums up the prices of the individual commodities to calculate a total mount of money, and causes the display unit 4 to display the total amount of money thereon. It is to be noted that, if there is no data stored in any of the registration memories of the IC card 6, then the CPU 11 executes processing for an error.

Subsequently, the CPU 11 causes the printer 22 to print the individual commodity data thus read out (PLU number, commodity name, weight, price per unit weight and price of the commodity) successively on receipt paper and finally print the total amount of money on the receipt paper, and then causes the printer 22 to issue a receipt.

After completion of the receipt issuing processing, the CPU 11 adds the customer number "1", total weight, total price and total commodity number to the contents of and updates the total customer number memory 3c, total weight memory 3d, total price memory 3e and total commodity number memory 3f of the IC card 6, respectively.

With such a construction as described above, even where a plurality of such weighing instruments are installed, a cable for interconnecting the weighing instruments is unnecessary. In particular, an operator and a customer will come to one of such weighing instruments, and then the operator will insert an IC card 6 owned by the operator in position into the IC card reading and writing device 5. In this condition, the customer will place a commodity the customer wants to purchase on the scale plate 2 and measure the weight of the commodity. The weight measured then is displayed on the display unit 4. Then, the operator will input the PLU number of the commodity by way of the ten keys and the PLU key on the keyboard 3.

Consequently, preset data of the commodity corresponding to the PLU number designated in this manner are read out from the IC card 6. In particular, a code, price per unit weight, packing, commodity name and so on are read out.

Then, the price per unit weight and the commodity name are displayed on the display unit 4. Meanwhile, a price of the commodity is calculated from the price per unit weight and the weight of the commodity and also displayed on the display unit 4.

In this manner, the weight, price per unit weight, price of the commodity and commodity name are displayed on the display unit 4.

Further, the PLU number, commodity name, weight, price per unit weight and price of the commodity then are stored into one of the registration memories of the IC card 6. The weighing and registration of the single commodity are thus completed.

Where weighing and registration are to be made for a next commodity on the same weighing instrument, the IC card 6 is left inserted in position, and the next commodity will be placed on the scale plate 2 and the PLU number of the commodity will be inputted by way of the keyboard 3.

To the contrary, in case the operator and the customer are to come to a location of another weighing instrument and perform weighing and registration for a next commodity, the operator will pull off the IC card 6 from the IC card reading and writing device 5, come to the location of the different weighing instrument and then insert the IC card 6 in position into the IC card reading and writing device 5 of the latter weighing instrument.

In this condition, if another commodity is similarly placed on the scale plate 2 in order to perform measurement of the weight of the commodity and then the PLU number of the commodity is inputted by way of the keyboard 3, then weighing and registration of the commodity are executed. Thus, the registration data then are stored similarly into one of the registration memories of the IC card 6.

In this manner, even if weighing and registering operations of a plurality of commodities are performed on a single weighing instrument or otherwise if weighing and registering operations of a plurality of commodities are performed on a plurality of weighing instruments, weighed and registered data of the customer are all stored in the IC card 6.

Then, if the sum total key is operated on a weighing instrument on which weighing and registration are performed finally, all of the registered data stored in the registration memories $3_1$ to $3_n$ of the IC card 6 so far are read out, and the prices of the individual commodities are summed up and the total amount of money is displayed on the display unit 4. The customer can thus recognize the total amount of money for the commodities purchased and will make payment of the same.

Meanwhile, all of the registration data read out from the registration memories $3_1$ to $3_n$ are successively printed on receipt paper by the printer 22, and finally the total price is printed whereafter a receipt is issued from the receipt issuing port 7. Further, the total customer number memory 3c of the IC card 6 is incremented by "1", the registered total weight is added to the contents of the total weight memory 3d, the registered total price is added to the contents of the total price memory 3e, and the registered total commodity number is added to the contents of the total commodity number memory 3f.

The weighing and registering operations for the single customer are completed in this manner.

Even where a plurality of weighing instruments are installed independently of each other without a cable interconnecting them, weighing and registration can be executed on different ones of the weighing instruments by using an IC card 6.

Further, since the IC card 6 includes the PLU file 3g therein, there is no need of provision of such a PLU file in the RAM 13 of each weighing instrument, and accordingly the capacity of the RAM 13 can be decreased as much.

Further, since the IC card 6 has an operator number and an operator name stored therein, it is a card for exclusive use of the operator. Accordingly, if commodities of which data are to be stored in the PLU file 3g are restricted, then commodities which can be handled by the operator can be managed readily. Further, since the IC card 6 includes the total customer number memory 3c, total weight memory 3d, total price memory 3e and total commodity number memory 3f therein, it can be recognized which number of customers are handled by each operator and how much the total weight, total price and total commodity number are. Accordingly, sales management of each operator can be made.

It is to be noted that while in the embodiment described above an IC card is provided for exclusive use of an operator, it is not necessarily limited to this, and it can be applied, for example, to such a system that an IC card is delivered to a customer at an entrance of a store and then the customer carries the IC card to a weighing instrument at which weighing and registration are executed by an operator, and finally at an exit, a sum total is calculated depending upon data registered in the IC card and payment for the same is made. It is to be noted that the memories 3a, 3b, 3c, , 3d, 3e and 3f can be eliminated.

What is claimed is:

1. An electronic weighing instrument, comprising a load detector for detecting a load to develop a digital signal, an IC card at least having a registration memory for commodities and a preset memory provided therein, a commodity designating means for designating a commodity to be weighed, an IC card reading and writing device operable in response to designation of a commodity by said designating means for reading out and writing data of the designated commodity from and into said IC card, a price calculating means for calculating a price of the commodity from a price per unit weight of the commodity read out from said preset memory of said IC card by said reading and writing device and a weight obtained from a digital signal from said load detector, a display unit for indicating at least the weight and the price of the commodity thereon, a registration controlling means for controlling said IC card reading and writing device to register at least a commodity code, the weight, the price per unit weight, and the price of the weighed commodity into said registration memory of said IC card, a summing up operating means for ending such registration, and a summing up processing means operable upon ending of the registration by said summing up operating means for controlling said IC card reading and writing device to read out the commodity data registered in said registration memory of said IC card and for calculating a sum total of the prices of the commodities and causing said display unit to indicate the sum total thereon.

2. An electronic weighing instrument according to claim 1, wherein said IC card has a total memory for a summing up function.

3. An electronic weighing instrument, comprising a load detector for detecting a load to develop a digital signal, an IC card at least having a registration memory for commodities and a preset memory provided therein, a commodity designating means for designating a commodity to be weighed, an IC card reading and writing device operable in response to designation of a commodity by said designating means for reading out and writing data of the designated commodity from and into said IC card, a price calculating means for calculating a price of the commodity from a price per unit weight of the commodity read out from said preset memory of said IC card by said reading and writing device and a weight obtained from a digital signal from said load detector, a display unit for indicating at least the weight and the price of the commodity thereon, a registration controlling means for controlling said IC card reading and writing device to register at least a commodity code, the weight, the price per unit weight, and the price of the weighed commodity into said registration memory of said IC card, a summing up operating means for ending such registration, a summing up processing means operable upon ending of the registration by said summing up operating means for controlling said IC card reading and writing device to read out the commodity data registered in said registration memory of said IC card and for calculating a sum total of the prices of the commodities and causing said display unit to indicate the sum total thereon, and a receipt issuing means for issuing a receipt on which the registration data of the commodities and the total price are printed.

* * * * *